# United States Patent Office 2,885,282
Patented May 5, 1959

2,885,282
RECOVERY OF MERCURY

Marshall P. Neipert and Charles K. Bon, Midland, Mich., assignors to The Dow Chemical Company, Midland, Mich., a corporation of Delaware No Drawing. Application July 3, 1957
Serial No. 669,716

9 Claims. (Cl. 75—121)

This invention relates to a process for the recovery of mercury, and more particularly, to a method of recovering mercury from brine effluent from mercury cathode electrolytic cells.

The mercury cathode electrolytic cells are constructed with a relatively small gap between a fixed anode and a steel plate or other current conducting material. In the operation of these cells, saturated sodium chloride or potassium chloride brine and mercury are passed through this gap during the electrolysis. The mercury upon entering the cell spreads over the steel plate or other conducting material and acts as a cathode for the cell. In the process saturated brine solutions are used. After passing the brine once through the cell, the brine discharged from the cell is dechlorinated by air stripping or other means, resaturated, and recycled again through the cell. When a sodium chloride brine is used, the brine generally will contain around 300 grams of sodium chloride per liter, while for potassium chloride solution, the chloride concentration may be up to around 350 grams of potassium chloride per liter. In passing through the cell the chloride concentration of the brine is seldom reduced over 20 percent. Thus, the brine discharge from the cell is still relatively saturated.

While the mercury cathode cells have many advantages over other conventional cells, a small but significant amount of mercury is lost in the process. A major portion of the mercury loss results from the chlorination of the mercury to a soluble salt which dissolves in the brine as it passes through the cell. This mercury which reacts with the chlorinated brine is often lost in the resaturation step of the process. The brine leaving the cell may contain as much as 50 parts of mercury per million parts of brine and in some cases a considerably greater amount. This loss of mercury while small per pass becomes considerable when a battery of cells is operated over an extended period of time.

It is, therefore, a principal object of this invention to provide a process for the recovery of mercury from the brine discharged from mercury cathode cells. A further object is to recover the mercury by an economical method which will not contaminate the brine and make it unsuitable for further electrolysis.

The above and additional objects may be accomplished by intermixing the brine effluent containing the mercury in a reacted form as a mercury compound with at least a stoichiometric amount of an aldehyde elected from the group consisting of formaldehyde and acetaldehyde at a pH of at least 7. The soluble mercury salts in the brine are reduced by the aldehyde to metallic mercury which is then recovered by settling.

It is surprising and unexpected to find that the small amount of mercury salt present in the relative saturated brine can be substantially completely reduced to metallic mercury by the addition of a small amount of formaldehyde or acetaldehyde and thus recovered. By this process the mercury may be recovered from natural or artificial sodium chloride brines or natural or artificial potassium chloride brines. Thus, the term "brine," as used herein, means natural or artificial aqueous solutions of sodium chloride or potassium chloride.

A batch or continuous process may be used. A continuous process is preferred. By using a continuous process the mercury recovery step may be very conveniently integrated into the present electrolysis process by placing the recovery step after the dechlorination of the brine effluent and prior to the resaturation. The dechlorinated brine discharge from the dechlorinated unit instead of going to the resaturation step is introduced into an agitated reactor to which formaldehyde or acetaldehyde is also continuously charged. A retention time in the agitated reactor of from ½ to 4 hours is provided. Within this time the reaction of the aldehyde in reducing the mercury salt is completed. The mixture is then passed to a settler or other classification equipment where the mercury settles out. The overflow from the settler is a substantially mercury-free brine which may then be resaturated in the normal method used in the process.

After the addition of the aldehyde to the brine, the pH of the brine is adjusted to at least a pH of 7, preferably in a range of 10 to 12. The brine effluent leaving the cell and after dechlorination is slightly acidic and thus a basic compound must be added. Any soluble alkaline compound, such as alkali metal hydroxides, alkaline earth metal hydroxides, carbonates, etc. may be used. For potassium chloride brines potassium hydroxide is preferred and for sodium chloride brines sodium hydroxide is preferred. By the use of these compounds, the brine is not contaminated by other metals.

The reaction temperature and pressure are not critical. Generally, atmospheric pressure is used and the brine is treated at its discharge temperature from the dechlorination unit which may be at a temperature in the range of 40° to 80° C.

While both formaldehyde and acetaldehyde may be used to reduce the mercury salt in the brine, formaldehyde is preferred. Formaldehyde is more active and complete recovery of the mercury can be obtained with a less amount of this aldehyde. Theoretically, only a stoichiometric amount of the aldehyde to react with the mercury salt is necessary. However, generally, even after the brine is dechlorinated, it will contain small amounts of chlorine which will react with the aldehyde. Consequently, the amount of aldehyde necessary will vary with the amount of chlorine present in the brine as well as the amount of mercury. Since the amount of aldehyde added is small, generally a sufficient excess is used to take care of any variation of chlorine or mercury the brine may contain. Normally, after the conventional methods of dechlorination, from 0.01 to 1.0 pound mole of formaldehyde or acetaldehyde per thousand gallons of brine will give substantially complete reduction of the mercury. For formaldehyde the amount preferred is from 0.05 to 0.1 pound mole per thousand gallons of brine, while for acetaldehyde the amount is a little greater being from 0.15 to 0.3 pound mole per thousand gallons of brine. If the dechlorination of the brine is not effective, larger amounts may be necessary.

The following examples further illustrate the invention but are not to be construed as limiting it thereto.

*Example I*

A continuous process was used to recover mercury from dechlorinated sodium chloride brine coming from a mercury cathode electrolytic cell. The dechlorinated sodium chloride brine containing 69 parts of mercury by weight per million parts of brine was charged to an agitated 60 gallon reactor at a rate of 1 gallon per minute. An aqueous solution of formaldehyde containing 37 weight percent of formaldehyde was also added to the reactor in an amount of 1.3 ml. per minute. The pH in the reactor was adjusted to 10.5 by the addition of sodium hydroxide. The effluent from the reactor was discharged into a 10" diameter settler and the metallic mercury allowed to settle. The overflow brine coming from the settler contained less than one part of mercury by weight per million parts of brine.

In a similar manner, the mercury in a potassium chloride brine effluent may be likewise recovered.

*Example II*

To 1 liter of dechlorinated sodium chloride brine effluent from a mercury cathode electrolytic cell containing around 14 parts of mercury per million parts of brine, 1 milliliter of acetaldehyde was added. Upon the addition of the acetaldehyde, sodium hydroxide was also added until the pH of the mixture was 10.5. The mixture was agitated for 4 hours and then allowed to settle. After 10 minutes settling, a sample of the brine was taken and analyzed. It was found that the brine contained less than one part by weight of mercury per million parts of brine.

In a similar manner, the mercury in a potassium chloride brine effluent may likewise be recovered.

What is claimed is:

1. A process for the recovery of mercury from dechlorinated brine effluent from mercury cathode electrolytic cells, which comprises intermixing the brine effluent containing the mercury in a reacted form as a soluble mercury compound with an aldehyde selected from the group consisting of formaldehyde and acetaldehyde in a proportion of from 0.01 to 1 pound mole of the aldehyde per thousand gallons of the brine at a pH of at least 7 to reduce the mercury compound to metallic mercury, and recovering the metallic mercury.

2. A process according to claim 1 wherein the aldehyde is formaldehyde.

3. A process according to claim 1 wherein the aldehyde is acetaldehyde.

4. A process for the recovery of mercury from dechlorinated brine effluent from mercury cathode electrolytic cells, which comprises intermixing the brine effluent containing the mercury in a reacted form as a soluble mercury compound with formaldehyde in a proportion of from 0.05 to 0.1 pound mole of formaldehyde per thousand gallons of brine at a pH in the range of 10 to 12 to reduce the mercury compound to metallic mercury, and recovering the metallic mercury.

5. A process according to claim 4 wherein the dechlorinated brine effluent is a sodium chloride brine.

6. A process according to claim 4 wherein the dechlorinated brine effluent is a potassium chloride brine.

7. A process for the recovery of mercury from dechlorinated brine effluent from mercury cathode electrolytic cells, which comprises intermixing the brine containing the mercury in a reacted form as a soluble mercury compound with acetaldehyde in a proportion of from 0.15 to 0.3 pound mole of acetaldehyde per thousand gallons of brine at a pH in the range of 10 to 12 to reduce the mercury compound to metallic mercury, and recovering the metallic mercury.

8. A process according to claim 7 wherein the dechlorinated brine effluent is a sodium chloride brine.

9. A process according to claim 7 wherein the dechlorinated brine effluent is a potassium chloride brine.

References Cited in the file of this patent

Novel Mercury Solution as a Reagent on Aldehydes and Especially Formaldehyde, Feder, Archive for Pharmacy, volume 245, 1907. Pages 25–28.